United States Patent
Bai et al.

(10) Patent No.: US 10,139,834 B2
(45) Date of Patent: Nov. 27, 2018

(54) METHODS AND SYSTEMS FOR PROCESSING LOCAL AND CLOUD DATA IN A VEHICLE AND A CLOUD SERVER FOR TRANSMITTING CLOUD DATA TO VEHICLES

(71) Applicant: GM GLOBAL TECHNOLOGY OPERATIONS LLC, Detroit, MI (US)

(72) Inventors: Fan Bai, Ann Arbor, MI (US); Donald K. Grimm, Utica, MI (US); Amit Mehta, Troy, MI (US); David D. Malkan, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 15/405,068

(22) Filed: Jan. 12, 2017

(65) Prior Publication Data

US 2018/0196443 A1     Jul. 12, 2018

(51) Int. Cl.
| | |
|---|---|
| *G05D 1/02* | (2006.01) |
| *G05D 1/00* | (2006.01) |
| *H04W 4/04* | (2009.01) |
| *H04W 4/02* | (2018.01) |
| *H04W 4/40* | (2018.01) |

(52) U.S. Cl.
CPC ......... *G05D 1/0276* (2013.01); *G05D 1/0022* (2013.01); *G05D 1/024* (2013.01); *G05D 1/0251* (2013.01); *G05D 1/0255* (2013.01); *G05D 1/0257* (2013.01); *H04W 4/023* (2013.01); *H04W 4/046* (2013.01); *H04W 4/40* (2018.02)

(58) Field of Classification Search
CPC .... G05D 1/0276; G05D 1/0022; G05D 1/024; G05D 1/0251; G05D 1/0255; G05D 1/0257; H04W 4/023; H04W 4/046
See application file for complete search history.

(56) References Cited

U.S. PATENT DOCUMENTS

| | | | |
|---|---|---|---|
| 6,400,996 B1 * | 6/2002 | Hoffberg ............ | G05B 19/0426 370/218 |
| 8,520,695 B1 * | 8/2013 | Rubin ..................... | G08G 9/02 370/445 |

(Continued)

*Primary Examiner* — Behrang Badii
*Assistant Examiner* — Daniel L Greene
(74) *Attorney, Agent, or Firm* — Lorenz & Kopf, LLP

(57) ABSTRACT

Methods and systems are provided for receiving local data via a vehicle sensing module of a vehicle control system, receiving remote data via a cloud interface unit of the vehicle control system from a cloud server, and processing the local data and the remote data via a processing unit of the vehicle control system. Based on the processing of the local data and the remote data, at least one vehicle feature is controlled. The local data and the remote data are associated with processing priority levels. The processing unit varies a frequency of processing based on the processing priority levels. Further provided is a cloud server for transmitting remote data to a crowd of vehicles. The cloud server comprises a first module configured to allocate vehicles to a plurality of groups based at least on location data received from the vehicles. A second module of the cloud server is configured to determine different remote data for each group. A third module is configured to transmit the determined remote data to vehicles within each group.

17 Claims, 7 Drawing Sheets

(56) References Cited

U.S. PATENT DOCUMENTS

| | | |
|---|---|---|
| 9,187,099 B2 | 11/2015 | Powers et al. |
| 2010/0106356 A1* | 4/2010 | Trepagnier ............ G01S 17/023 |
| | | 701/25 |
| 2011/0130905 A1* | 6/2011 | Mayer .................... G07C 5/008 |
| | | 701/22 |
| 2013/0201316 A1* | 8/2013 | Binder .................... H04L 67/12 |
| | | 348/77 |
| 2014/0303806 A1 | 10/2014 | Bai et al. |
| 2016/0124976 A1 | 5/2016 | Bai et al. |
| 2016/0133131 A1 | 5/2016 | Grimm et al. |

* cited by examiner

METHODS AND SYSTEMS FOR PROCESSING LOCAL AND CLOUD DATA IN A VEHICLE AND A CLOUD SERVER FOR TRANSMITTING CLOUD DATA TO VEHICLES

TECHNICAL FIELD

The technical field generally relates to processing of data obtained from different sources for controlling a vehicle. Additionally, the technical field relates to transmission of data between vehicles and a cloud server.

BACKGROUND

Vehicle control systems are increasingly using data obtained from different sources in order to automatically control features of a vehicle. Local data from a vehicle sensing module is used to control various vehicle features such as automated power steering and automatic brake activation. The local data can include data obtained from an object detection unit including a camera and radar and data obtained from a vehicle to vehicle communications unit, which can be processed to determine upon automated vehicle control features to avoid collision with objects such as pedestrians, road infrastructure and other vehicles. These different sources of local data are processed separately, requiring some form of control arbitration to determine, for example, how to prioritize and implement control commands produced from separate processing schemes.

An additional complication lies in a proposal for vehicle control systems to take into account remote data received from a cloud server. The remote data can be formulated based on a collation of a crowd of local data uploaded from many vehicles to the cloud server. The current proposals provide a further separate control system that will either run independently from the vehicle control systems based on local data or will require an extra layer of arbitration.

Whilst vehicle control systems have significant data processing capabilities, there is a limit to the amount of data that can be processed with the requisite speed. The seamed layers of processing and arbitration of local and remote data in the prior art add to processing inefficiency and place limitations on capabilities of the vehicle control system to manage further data sources.

Accordingly, a need exists for integrated management of data from local and remote data sources. Further, a platform is required at the cloud server side and the vehicle side that is able to provide feasible data management and efficient processing to take into account the local and remote data for controlling a vehicle. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for receiving local data via a vehicle sensing module of a vehicle control system, receiving remote data via a cloud interface unit of the vehicle control system from a cloud server, and processing the local data and the remote data via a processing unit of the vehicle control system. Based on the processing of the local data and the remote data, at least one vehicle feature is controlled. The local data and the remote data are associated with processing priority levels. The processing unit varies a frequency of processing based on the processing priority levels.

Further provided is a cloud server for transmitting remote data to a crowd of vehicles. The cloud server comprises a first module configured to allocate vehicles to a plurality of groups based at least on location data received from the vehicles. A second module of the cloud server is configured to determine different remote data for each group. A third module is configured to transmit the determined remote data to vehicles within each group.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the terms module and unit refer to an application specific integrated circuit (ASIC), an electronic circuit, a processor (shared, dedicated, or group) and memory that executes one or more software or firmware programs, a combinational logic circuit, and/or other suitable components that provide the described functionality. In particular, the units and modules described herein include at least one processor, a memory and computer program instructions stored on the memory for implementing the various functions and processes described with respect to the modules and units. Although separate modules and units are described herein, this does not exclude an integrated topology.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
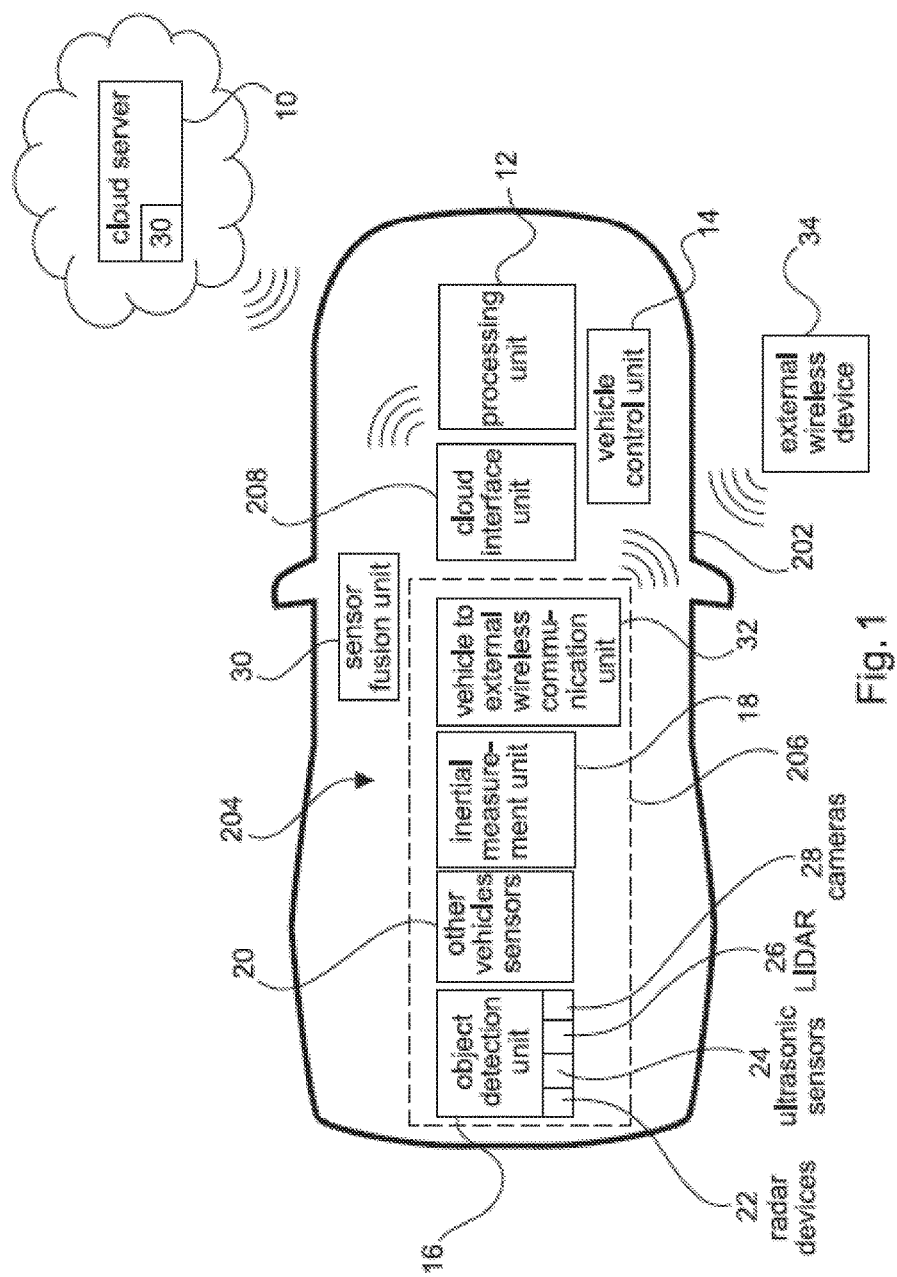
FIG. 1 is a functional block diagram of a vehicle having units for receiving remote data, sensing local data and processing the data to control a vehicle feature in accordance with various embodiments.

With reference to FIG. 1, a system is shown including a vehicle 202 and a cloud server 10 in accordance with various embodiments. The vehicle 202 includes a control system 204 that combines locally sourced data 205 and remote data 207 in order to control vehicle features. The control system 204 includes a vehicle sensing module 206 configured to provide the local data 205 to a processing unit 12 and a cloud interface unit 8 configured to receive the remote data 207 from the cloud server 10 and provide the remote data 207 to the processing unit 12. The processing unit 12 is configured to process the local data 205 and the remote data 207 and to generate at least one vehicle control command 13. The control system 204 further includes a vehicle control unit 14 configured to control at least one vehicle feature based on the at least one vehicle control command. Although the figures shown herein depict an example with certain arrangements of elements, additional intervening elements, devices, features, or components may be present in actual embodiments. It should also be understood that FIG. 1 is merely illustrative and may not be drawn to scale.

In various embodiments, the local data 205 can be provided based on a variety of on-board sensors. For example, in FIG. 1, there is shown an object detection unit 16, an inertial measurement unit 18 and other vehicle sensors 20. The object detection unit 16 is configured to provide local data 205 concerning local objects external to the vehicle 202 based on sensed information from at least one object sensor 22, 24, 26, 28 described further below. The inertial measurement unit 18 is configured to provide local data concerning vehicle motion variables based on sensed information from at least one vehicle motion sensor. The inertial measurement unit 18 may include at least one of vertical, lateral, longitudinal, pitch, yaw and roll accelerometers. The other vehicle sensors 20 may include wheel speed, suspension, humidity, windscreen wiper, air bag and cruise control sensors, for example.

The object detection unit 16 may include at least one object detection sensor 22, 24, 26, 28. The object detection sensors 22, 24, 26, 28 may include at least one of the following: one or more cameras 28, one or more radar devices 22 including short-range radar devices and long-range radar devices, one or more ultrasonic sensors 24, and one or more Light Detection And Ranging (LiDAR) sensors 26, for example. The one or more cameras 28 may include a monocular camera and/or a stereo camera that provides enhanced object range detection. Such sensors sensing external conditions may be oriented in any of a variety of directions without departing from the scope of the present disclosure. For example, cameras 28 and radar devices 22 may be oriented at each, or selected, positions of, for example: (i) facing forward from a front center point of the vehicle 202, (ii) facing rearward from a rear center point of the vehicle 202, and (iii) facing laterally of the vehicle 202 from a side position of the vehicle 202.

The vehicle sensing module 206 of FIG. 1 further includes a vehicle to external device communications unit 32 configured to detect and wirelessly communicate with any of a wide variety of external wireless devices 34 such as wireless devices of other vehicles, pedestrian wireless devices such as smart phones and infrastructure capable of communicating wirelessly such as smart traffic lights. Accordingly, the vehicle to external device communications unit 32 may include short-range communications including at least one of vehicle-to-vehicle (V2V) communications, vehicle-to-pedestrian communications (V2P), and communicating with transportation system infrastructure (V2I). Example V2V communications protocols include the dedicated short-range communication (DSRC) protocol or other types of WiFi protocols. The data received through the vehicle to external device communications unit 32 may include motion parameters of other vehicles (such as speed, braking, steering, etc.), location of pedestrians and status and location of road infrastructure.

The vehicle control system 204 includes a sensor fusion unit 30 configured to fuse the local data 205 from at least some of the sensors of the object detection unit 16, the inertial measurement unit 18 and the vehicle to external wireless communications unit 32. Sensor fusion is combining of sensor data derived from different sensors (such as the radar devices 22 and the cameras 28) such that the resulting information has less uncertainty than would be possible when these sources were used individually. The term uncertainty reduction in this case can mean more accurate, more complete, or more dependable. The sensor fusion unit produces fused sensor data 31 (see FIG. 2), which is often referred to herein as local data since the sensor fusion unit 31 is an optional, if desirable, feature.

In various embodiments, the cloud interface unit 208 is configured to receive remote data 207 from the cloud server 10. Thus, the vehicle sensing module 206 is able to provide local data 205 concerning a local field, particularly including data tracking neighboring vehicles, infrastructure and pedestrians (sometimes referred to as objects herein) and data concerning motion of the vehicle 202. The remote data can concern road and other vehicle information from further afield. In various embodiments, the remote data is provided by the cloud server 10 and is based on information received by the cloud server 10 from a crowd of other vehicles or other sensor devices deployed in the surroundings, e.g. in a city, associated with a building, road infrastructure, etc. The cloud server 10 includes a server processing unit 130 including the requisite processing capabilities, computer program instructions and memory for preforming the functions and processes described herein.

The cloud interface unit 208 is configured to receive remote data 207 from the cloud server 10 including at least one of: road slip information (e.g. estimated coefficient of friction of road surface), pothole information, congestion information, road closure information, weather information, accident information, lane closure information, etc. Such information may be determined by the cloud server 10 based on data uploaded from a crowd of vehicles that has been obtained from vehicle sensing modules of a number of vehicles. For example, the control system 204 is configured to upload data, via the cloud interface unit 208, obtained from the vehicle sensing module 206, optionally after sensor fusion by the sensor fusion unit 30 and other processing operations. Assuming other vehicles are configured to upload similar such data, local sensor data from a crowd of vehicles is available for the cloud server 10 to collate and process to determine road conditions.

In one embodiment, each vehicle of a crowd of vehicles, including vehicle 202, may upload local data 205 obtained from the vehicle sensing module 206 concerning, for example, vehicle speed (from a vehicle speed sensor), weather (e.g. from a humidity sensor, a wiper sensor, tire pressure, tire temperature, ambient temperature sensor, etc.), congestion (e.g. from a vehicle speed sensor, object detection unit 16 such as radar device 22 and/or cameras 28, or the vehicle to external wireless communications unit 32), potholes (e.g. from the inertial measurement unit 18 such as one or more acceleration sensors indicating wheel acceleration or other vehicle sensors 20 such as a suspension sensor), road slip information (e.g. from one or more accelerometers of the inertial measurement unit 18), road closure information (e.g. from a vehicle to infrastructure part of the vehicle to external wireless communications unit 32), accident information (e.g. from the object detection unit 16), and lane closure information (e.g. from a steering column sensor of the other vehicle sensors 20, from the cameras 28, or from a vehicle to infrastructure part of the vehicle to external wireless communications unit 32). Such local data 205 may be uploaded to the cloud server 10 without the control system performing the processing necessary to classify the data to a particular road or vehicle condition. Such processing may instead be performed at the cloud server 10. Since the cloud server 10 has corresponding information available for a crowd of vehicles, more reliable and precise assessments can be made as to road conditions.

According to various embodiments, the control system 204 is configured to upload local data 205 to the cloud server 10 including global positioning data (e.g. GPS) for the vehicle 202 and local data 205 obtained from the object detection unit 16, the inertial measurement unit 18, the vehicle to external wireless communications unit 32 and the other vehicle sensors 20.

Figure 2:
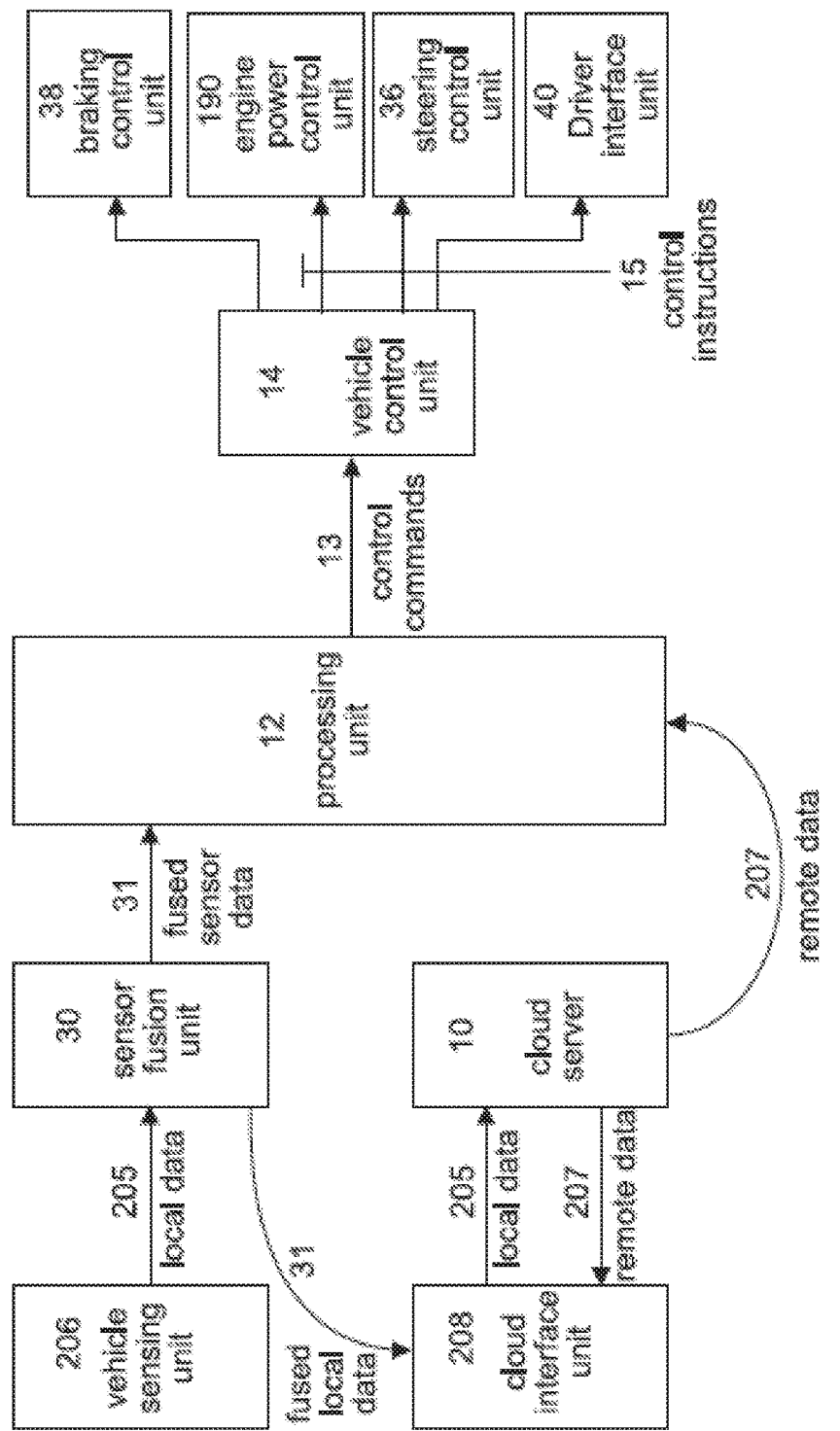
FIG. 2 is a data flow diagram including exemplary units for determining control commands based on remote and local data in accordance with various embodiments.

In various embodiments, and continuing to refer to FIGS. 1 and 2, the processing unit 12 is configured to receive the remote data 207 from the cloud interface unit 208 and the local data 205, 31 from at least one of the sensor fusion unit 30 and the vehicle sensing module 206. The processing unit 12 is configured to process the remote and local data 205, 207 as described further below with respect to FIGS. 2 and 3 in order to generate at least one control command 13 that commands a responsive action based on the remote and local data 205, 207. The vehicle control unit 14 is configured to respond to the control command to take appropriate action by controlling at least one vehicle feature through at least one control instruction 15. For example, the vehicle control unit 14 may output a control instruction 15 to at least one of a steering control unit 36, a braking control unit 38, an engine power control unit 190 (for controlling vehicle speed) and a driver interface unit 40.

A few examples are provided in the following of any number of possible responses executed by the vehicle control unit 14 and the processing unit 12 to the remote and local data 205, 207. The instructions 15 to the braking control unit 38 may execute an automated slowdown or stop of the vehicle 202, through vehicle brakes (not shown), in response to local data 205 from the object detection unit 16 and/or the vehicle to external wireless communications unit 32 in order avoid collision with an obstacle, such as a fixed obstacle, e.g. infrastructure neighboring a road, a pedestrian or another vehicle. The instructions 15 to the braking control unit 38 and/or the engine power control 190 may execute an automated slowdown of the vehicle 202 in response to remote data concerning at least one of congestion, lane closure, slippery road surface, pothole and weather. Control instructions 15 may be sent to the steering control unit 36 to execute a lane change or other steering operation, through an automated steering actuator (not shown), in response to local data from the object detection unit, possibly to avoid a collision. Control instructions 15 may be sent to the steering control unit 36 to execute a lane change or other steering operation in response to remote data concerning congestion, lane closure, pothole and weather, for example.

In addition, or alternatively, to steering and braking responses to the remote and local data 205, 207, the driver interface unit 40 may issue an alert for the driver regarding the remote and/or local data 205, 207. For example, an alert may be issued informing a driver of at least one of a proximal object as detected by the object detection unit 16, a weather alert may be issued based on the remote data 207, a pothole alert may be issued based on the remote data 207, a slippery road alert may be issued based on the remote data 207, a lane or road closure alert may be issued based on the remote data 207, a congestion alert may be issued, an accident alert may be issued, etc.

In embodiments, the remote and local data 205, 207 are collaboratively processed by the processing unit 12 so that any action taken as a result of the remote data 207 is influenced by input from the local data 205 and vice versa. For example, braking distances and steering reaction are influenced by inclement weather conditions and road slipperiness. Accordingly, remote data 207 from the cloud interface unit 208 concerning weather and/or road slip are taken into account when formulating control commands 13 or control instructions 15 in order to set an appropriate steering control instruction for the steering control unit 36 and/or an appropriate braking control instruction for the braking control unit 38. Also, any steering instruction for the steering control unit 36 and/or braking instruction for the braking control unit 38 determined as a result of remote data 207 concerning pothole, lane closure, congestion, etc. may be determined to further take into account local data 205 from, for example, the object detection unit 16 and/or the vehicle to external communications unit 32 to ensure the instructions avoid the vehicle 202 colliding with an obstacle.

Referring now primarily to FIG. 2, but with reference also being made to the system of FIG. 2, a data flow diagram is shown. The vehicle sensing module 206 produces local data 205 that is transmitted to the cloud server 10 by the cloud interface unit 208 and which is sent to the processing unit 12. The cloud interface unit 208 is in communication with the cloud server 10 over a cellular network. The local data 205 from the vehicle sensing module 206 may first be fused by the sensor fusion unit 30, in which case fused local data 31 is transmitted to the cloud server 10 and fused local data 31 is sent to the processing unit 12.

The cloud server 10 receives local data from a crowd of vehicles and other external data sources and determines remote data 207 to be sent to the vehicle 202 via the cloud interface unit 208 thereof. The remote data 207 that has been transmitted will be within a geographical field of relevance for the vehicle 202 based on global positioning data uploaded from the vehicle 202, as described further below with respect to FIGS. 4 to 7. The remote data 207 is thus filtered by the cloud server 10 to ensure relevant information is provided to the control system 204 to reduce bandwidth requirements and on-vehicle processing requirements.

The processing unit 12 receives the remote data 207 and the local data 205, 31 and collaboratively processes the data to produce control commands 13 for a vehicle control unit 14. Further, the processing unit 12 processes the local and remote data 205, 207 at a rate depending on processing priority level. In an embodiment, processing priority is determined based on risk assessment and/or threat immediacy as described below with respect to FIG. 3. Based on the control commands 13, the vehicle control unit 14 issues control instructions 15 to any one or more of a number of vehicle control actuators such as a braking control unit 38, an engine power control unit 190, a steering control unit 36 and a driver interface unit 40.

As can be appreciated, there could be a considerable amount of data processing required for the on-board control system 204 due to the incoming local and remote data from multiples sources. The present disclosure proposes a platform that limits the remote data 207 being received to relevant remote data and controls processing frequency in order to ensure a feasible control system 204, whilst prevent or keeping to a minimum any loss of functionality. These effects can be achieved in a multitude of ways as described below including distance filtering the remote data 207, update frequency control depending on processing priority (risk) level associated with data and transmitting remote data 207 from the cloud server 10 to positionally or mobility related groups of vehicles.

Figure 3:
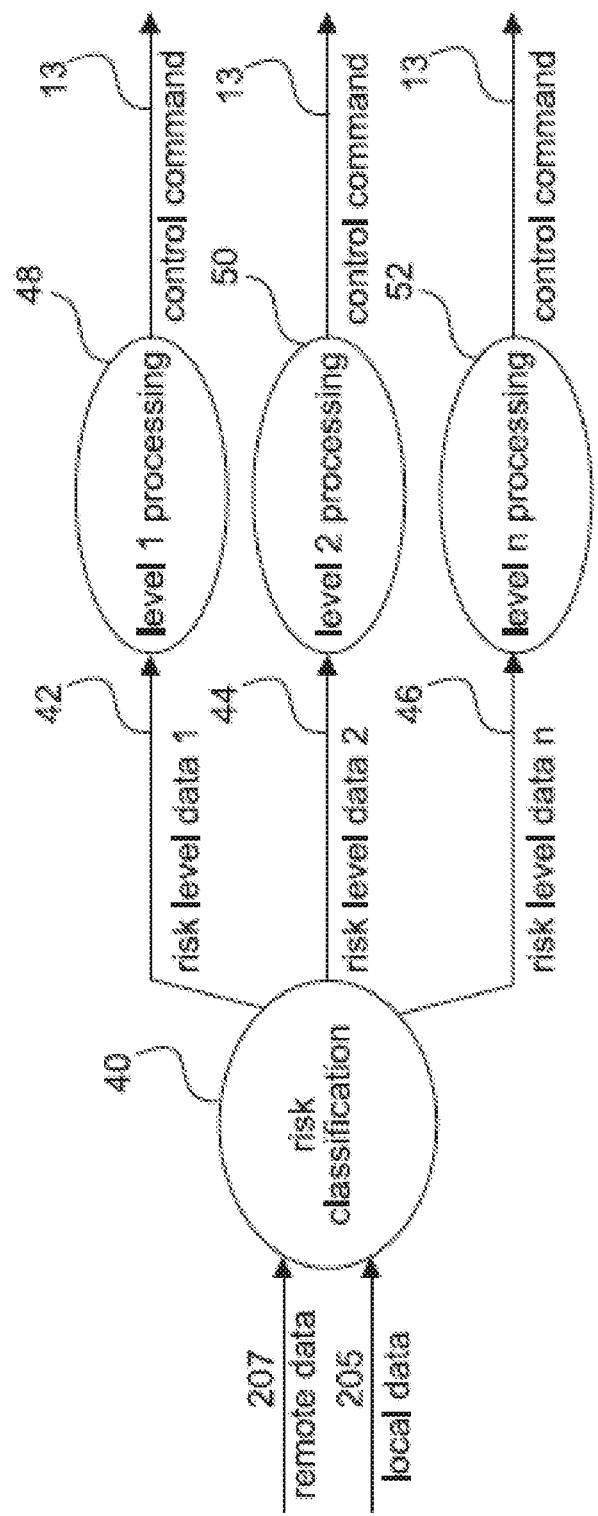
FIG. 3 is a data flow diagram showing varying processing rates for converting remote and local data into control commands based on risk classification in accordance with various embodiments.

In various embodiments, and with reference also to FIG. 3, the remote and local data 205, 207 is classified according to processing priority (determined risk) level. In embodiments, the processing unit 12 is configured to vary a frequency of processing of the remote and local data 205, 207 from the vehicle sensing module 206 and the cloud interface unit 208 depending upon processing priority (risk) level classification. In particular, the frequency of processing increases as the processing priority (risk) level classification is increased. There may be at least three processing priority (risk) levels, at least four processing priority (risk) levels, at least five processing priority (risk) levels, etc.

In various embodiments, the local data 205 is classified into at least two processing priority (risk) levels and the remote data 207 is classified into at least two further processing priority (risk) levels. Each processing priority (risk) level is associated with a different frequency of processing of the remote and local data 205, 207, via the processing unit, in order to generate at least one control command 13.

In an exemplary embodiment, local data from the object detection unit 16 is classified in a first processing priority (risk) level. The object detection unit 16 generally detects objects at a distance from the vehicle 202 of around 50 meters or less in one example. Further, local data 205 from the vehicle to external wireless communications unit 32 is classified in a second processing priority (risk) level. The vehicle to external wireless communications unit 32 may, for example, detect objects at a distance from the vehicle 202 of 250 m or less. Remote data 207 concerning road slip may be classified in a third processing priority (risk) level. Such data may be received by the cloud interface unit 208 for at least the currently used road and within a radius of 2 km or less from the vehicle 202. Remote data 207 concerning a road closure, a lane closure and/or a pot hole may be classified in a fourth processing priority (risk) level. Such remote data may be received by the cloud interface unit 208 for roads within a radius of 2 km or less from the current position of the vehicle 202. Remote data 207 concerning traffic congestion may be classified in a fifth processing priority (risk) level. The congestion data may be received by the cloud interface unit 208 for at least the currently used road within a radius of 5 km of the current position of the vehicle 202. According to such an exemplary embodiment, the processing frequency of the remote and local data 205, 207 decreases from the higher processing priority (risk) first level to the lower processing priority (risk) fifth level, thereby reducing processing requirements with minimal, if any, loss of functionality. For those skilled in the art, it would be understood that the functions and distance parameters presented herein are of illustrative nature as one example and that other variations are applicable.

FIG. 3 illustrates an exemplary data flow diagram for processing the remote data 207 and the local data 205 at varying update frequency depending upon risk classification of data items. The processes shown in FIG. 3 may be implemented by modules of the processing unit 12 and/or the cloud server 10. The modules may be implemented by a combination of memory, computer processor and software.

The remote data 207 and the local data 205 are subjected to a priority level (risk) classification process 40, which may be performed by at least one of the processing unit 12 and the cloud server 10. For example, local data 205 obtained from the object detection unit 16 may be classified as processing priority (risk) level one data by the processing unit 12. Local data 205 obtained from the vehicle to external wireless communications unit 32 may be classified as processing priority (risk) level two data 44. A corresponding processing priority (risk) classification process may be performed for each data subject. Exemplary data subjects are those described above including subjects selected from the group of: detected objects (e.g. pedestrians, traffic regulator, road infrastructure and other vehicles), road slip, weather, traffic congestion, potholes, lane closures, etc. In another example, an $n^{th}$ data subject, which may be remote data 207 obtained from the cloud server 10, can be classified as processing priority (risk) level n data 46.

Continuing to refer to FIG. 3, the processing priority (risk) level one data 42 is subjected to level one processing 48, the processing priority (risk) level two data is subjected to level two processing 50 and the processing priority (risk) level n data is subjected to level n processing 52 to produce respective control commands 13. Level one processing 48 is performed more frequently than level two processing 50, which is performed more frequently than level n processing. In a relationship of lower processing priority (risk) level numbers correlating to higher processing priority (risk), a frequency of processing is proportional to 1/n.

Referring back to FIG. 1, the cloud server 10 may be configured to push remote data 207 to the cloud interface unit 208 or the cloud interface unit 208 may be configured to pull remote data 207 from the cloud server 10. In addition to the remote data being processed in a frequency adaptive way depending upon processing priority (risk) classification, the remote data 207 transmitted from the server 10 is limited in geographical coverage in a way that varies in dependence on the subject of the data. Accordingly, the remote data 207 includes data covering varying distances depending upon the subject. In this way, an appropriate and feasible amount of remote data 207 is managed by the on-vehicle processing unit 12 depending on the subject of the remote data 207, as will be explained in further detail below.

In various embodiments, remote data 207 is received by the cloud interface unit 208 and each data item is associated with data subjects. Exemplary data subjects are road slip information, pothole information, weather information, road accident information, lane closure information, traffic congestion information, road closure information, or other fixed traffic regulator such as stop sign, speed limit, etc.

In various embodiments, the remote data 207 received by the cloud interface unit 208 from the cloud server is filtered based at least partly on distance from the vehicle 202, where different data subjects are filtered based on different distances from the vehicle 202. For example, the cloud server 10 provides road slip data to the cloud interface unit 208 that is restricted or filtered to cover a distance of 500 meters (for example) or less from the vehicle 202. The filtered road slip data may correspond to road slip data at selected points along the road in the direction of travelling up to 500 meters (for example), road slip data at selected points along the road currently being used at distances of up to 500 meters in both directions, or including selected points along some or all roads within a 500 meter (for example) radius of the vehicle 202. Different data subjects may be associated with different distance filters. For example, the cloud server 10 provides road or lane closure data to the cloud interface unit 208 that is restricted or filtered to include a radius of a different distance from the vehicle 202 of two kilometers or less (for example). Congestion information, another data subject, may be provided up to a radius from the vehicle 202 of up to 5 kilometers.

Figure 4:
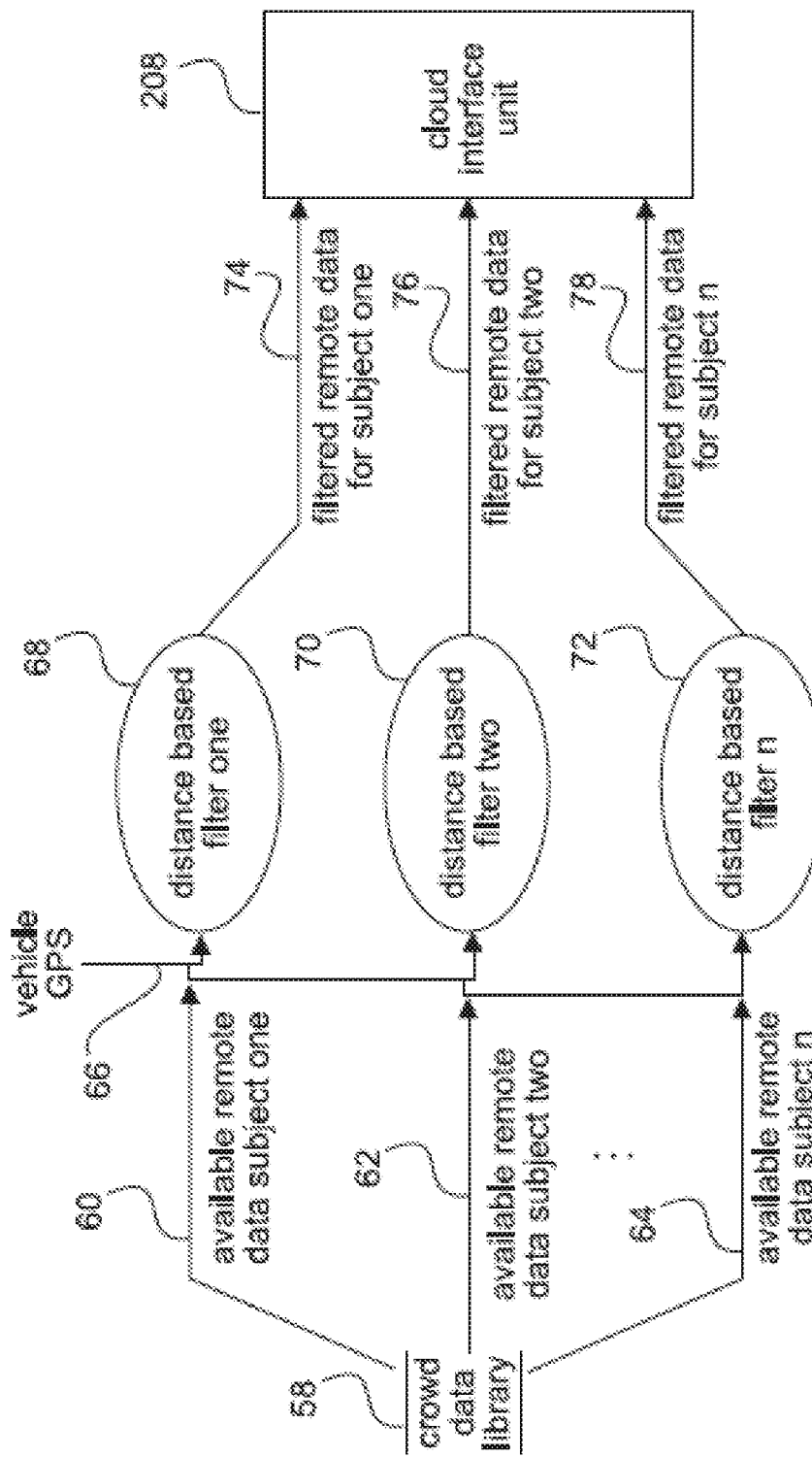
FIG. 4 is a data flow diagram illustrating distance based filtration of available remote data to reduce the volume of data transmitted to a vehicle control system in accordance with various embodiments.

FIG. 4 shows an exemplary embodiment of a data flow diagram for providing remote data 207 to the cloud interface unit 208 that is filtered based on different distances depending upon a subject of the data. The processes of FIG. 4 may be implemented by the server processing unit 130. The cloud server 10 is configured to construct a crowd data library 58 based on data received from a crowd of vehicles as has been described above. The server 10 is configured to collate the data received from the crowd of vehicles and process such data in order to determine available remote data concerning different subjects at different road positions. The subjects can include traffic regulators, road slip, road closure, lane closure, pothole, congestion, average speed, weather, accidents, etc.

Continuing to refer to FIG. 4, the cloud server 10 receives global position data (e.g. GPS) 66 from the vehicle 12 via the cloud interface unit 208 and has access to remote data available in the crowd data library 58 for subject one (e.g. road slip), subject two (e.g. potholes) to subject n (e.g. lane closure). The cloud server 10 makes use of distance based filtering processes one, two . . . to n 68, 70, 72. The distance based filtering processes 68, 70, 72 provide filtered remote data 74, 76, 78 for each subject (subject one, subject two to subject n) that have been filtered to include data within different distances from the vehicle 202, which is known from the vehicle GPS data 66, depending on the subject. For example, distance based filter one 68 provides road slip data at selected positions within a first radius from the vehicle 202. Distance based filter two 70 provides pothole data at selected positions within a second radius from the vehicle 2. Distance based filter n provides lane closure data within a third radius from the vehicle 2. The cloud interface unit 208 receives the distance filtered remote data 74, 76, 78 for each subject one, two to n as part of the aforementioned remote data 207.

Figure 5:
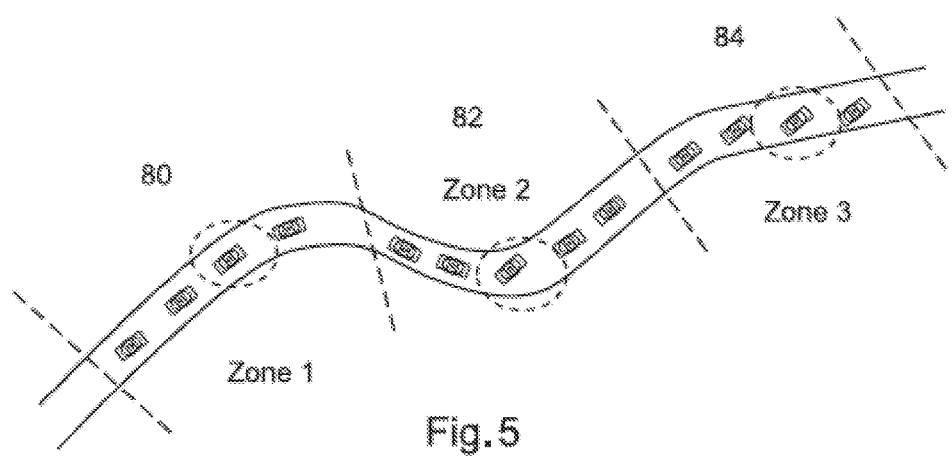
FIGS. 5 and 6 are schematic drawings illustrating virtual partitioning of local data sources based on predetermined geographical zones and adaptive vehicle groups according to alternative exemplary embodiments.
Figure 6:
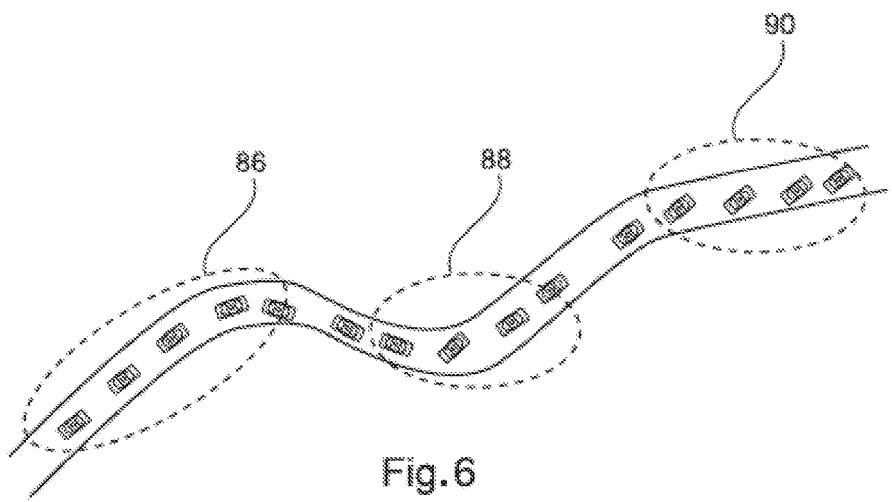

FIGS. 5 and 6 illustrate exemplary organization of partitions so that multiple vehicles can be sent the same remote data 207 to assist in reducing computational load for the cloud server 10. In the exemplary organization of FIG. 5, the server 10 has a static partitioning architecture, whereby roads are divided into geographical zones 80, 82, 84. Each participating vehicle uploads global positioning data to the server 10 and responsively receives a package of remote data 207 calculated for each zone 80, 82, 84 corresponding to the uploaded global position of each vehicle. The package of remote data may include distance filtered data as described above with respect to FIG. 4.

In the exemplary organization of FIG. 6, groups 86, 88, 90 are adaptively defined by the cloud server 10. In particular, the cloud server 10 receives mobility data from vehicles in addition to global position data and formulates groups of vehicles 86, 88, 90 having similar geographical positions and mobility data. The vehicles in each group receive the same package of remote data 207, but different groups receive different packages of remote data 207. For example, vehicles may upload speed as the mobility data. A correlation algorithm may be run by the cloud server 10 to determine group 86, 88, 90 and criteria for the groups based on correlating position and mobility data for the crowd of vehicles. The groups 86, 88, 90 do not have to extend over the same geographical extent as each other, can change in size or number of participating vehicles with time, can differ from each other in terms of number of participating vehicles and can even overlap each other in terms of geographical coverage (for example in the case of a multi-lane highway). The cloud server 10 can run a group participation algorithm that continuously updates membership of the group based on correlating mobility and global positioning data.

Figure 7:
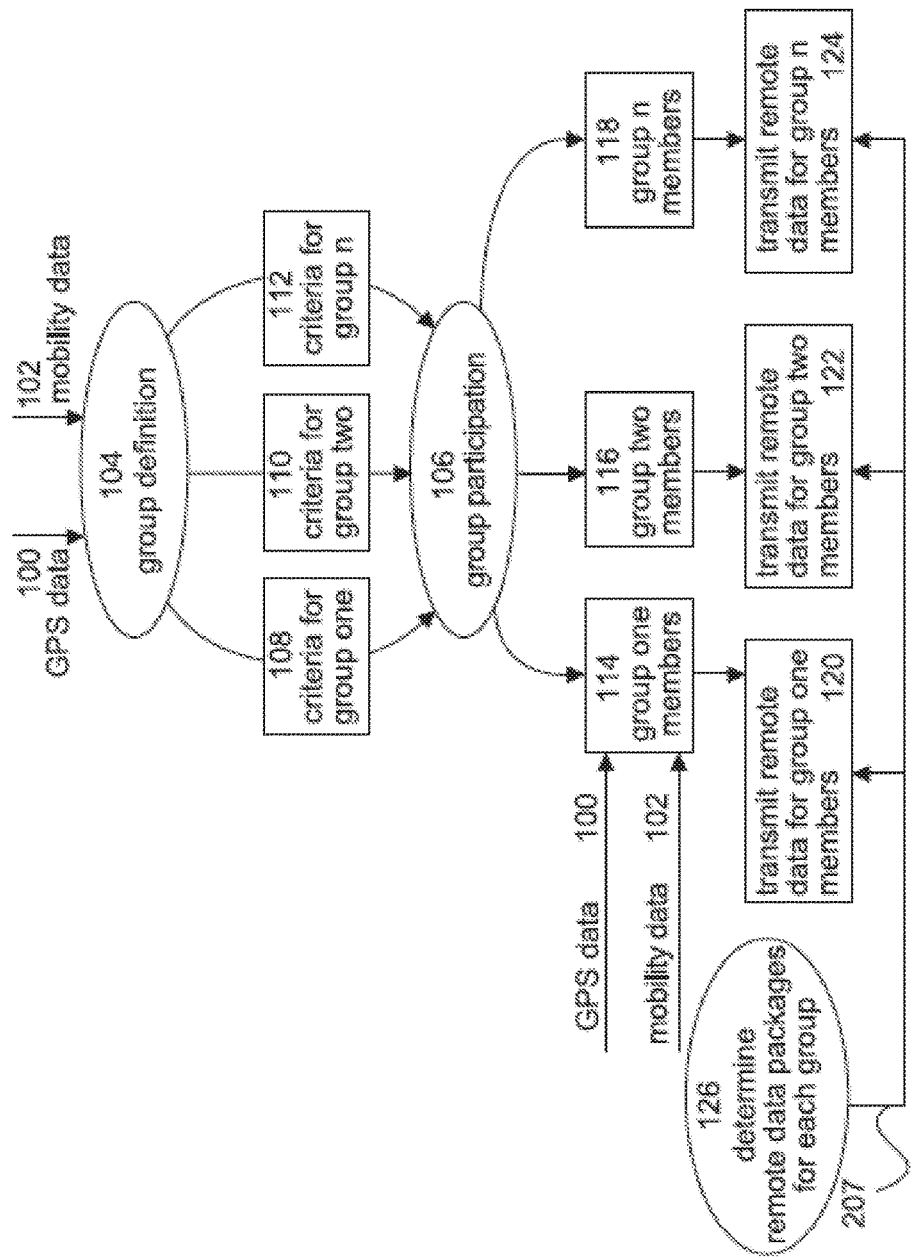
FIG. 7 is a data flow diagram illustrating group definition and allocation of vehicles into groups in order to transmit common remote data to vehicles in each group in accordance with various embodiments.

FIG. 7 shows a data flow diagram for defining the groups 86, 88, 90 and participation thereof according to an adaptive scheme that takes into account mobility data. The processes of FIG. 7 may be implemented by the server processing unit 130 of the cloud server 10. The cloud server 10 receives global positioning data 100 and mobility data 102 from a crowd of vehicles. The cloud server executes group definition processing 104, which correlates global position data and mobility data for the crowd of vehicles to determine participation criteria for group one 108, participation criteria for group two 110 and participation criteria for group n 112. Group participation processing 106 is performed by which global positioning data 100 and location data 102 are processed to allocate each vehicle of a crowd of vehicles as a member of one of the groups based on the participation criteria 108, 110, 112. The group participation processing 106 results in a partition of group one members 114, group two members 116 and group n members 118. The cloud server 10 determines different remote data packages for each of the groups 1 to n in process 126 and transmits the remote data 207 (in the form of different packages for each group) to the members of each group in transmission outputs 120, 122, 124. The group participation processing 106 and the group definition processing 104 are iteratively performed to allow group participation and group definition to adapt to crowd road behavior and also to allow continual update of the group membership.

Figure 8:
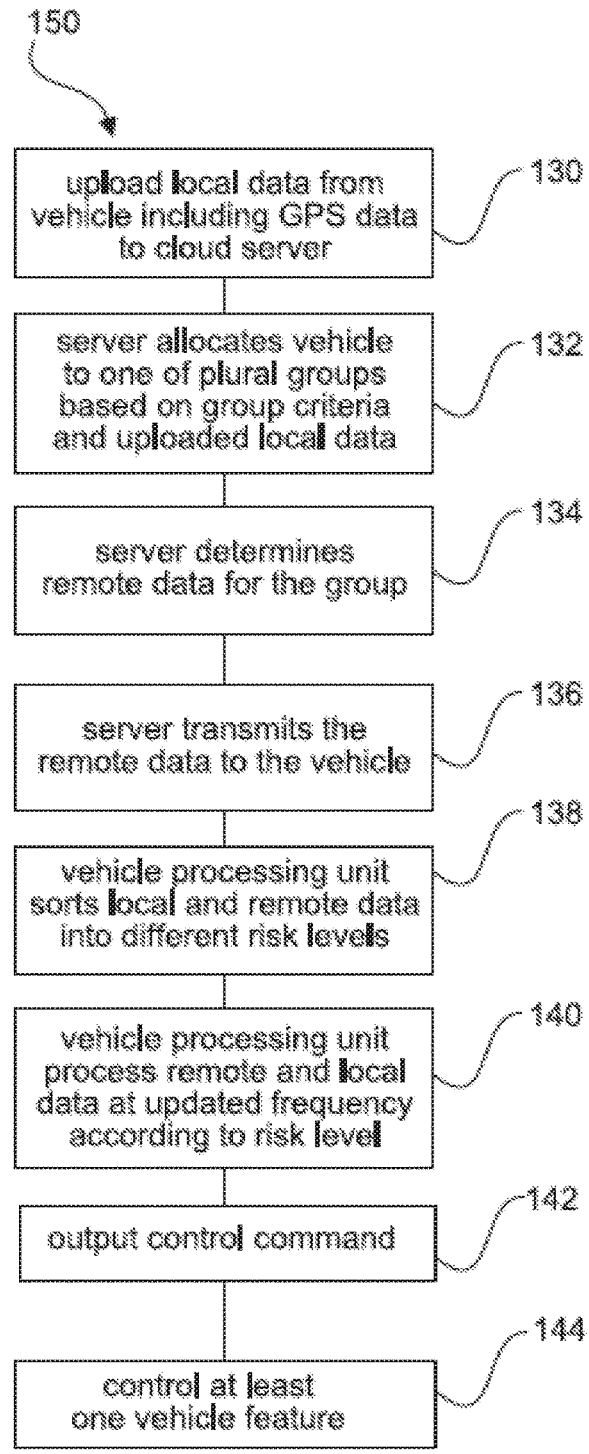
FIG. 8 is a flow chart illustrating an overview of control methods in accordance with various embodiments.

FIG. 8 shows a flowchart providing an overview of the methods 150 described herein and the processes performed by the systems described herein. It will be appreciated that the methods of FIG. 8 are able to be performed by modules, which may be a combination of computer program instructions, memory and a processor located at the cloud server 10, at the vehicle 202 or distributed therebetween.

At step 130, the control system 204 for the vehicle 202 uploads local data 205 or the fused local data 31 to the cloud server 10. In addition, global positioning data 100 regarding a geographical location of the vehicle 202 is uploaded to the cloud server 10. The data is uploaded through the cloud interface unit 208.

At step 132, the server 10 allocates the vehicle 202 to one of the groups 86, 88, 90. In particular, the server 10 compares at least one of the global positioning data 100 for the vehicle 202 and some part of the local data 205, 31 (e.g. mobility data 102 thereof) to criteria 108, 110, 112 for various groups in order to allocate the vehicle to one of the groups 86, 88, 90. Step 132 may allocate vehicles to groups according to that described with respect to FIGS. 5, 6 and 7.

At step 134, the server 10 determines remote data 207 for each of the groups 86, 88, 90. The remote data 207 is determined based on local data 205 obtained from a crowd of vehicles at locations corresponding to geographical coverage of the group amongst other criteria. The remote data 207 may be associated with subjects for each category of remote data 207. For example, the remote data may be associated with a tag indicting the subject for each data item in the remote data 207. The subjects of the remote data 207 may include at least one of traffic regulator, road slip, weather, potholes, construction work, lane closure, congestion, road closure, etc. Each data item in the remote data 207 may be associated with a corresponding tag. The server 10 determines a limited amount of remote data available in the crowd data library 58 based on different distance filters 68, 70, 72, each corresponding to different distance coverage, depending upon the data subject, as has been described with respect to FIG. 4.

At step 136, the server 10 transmits the remote data 207 to the vehicles in each group including to the vehicle 202 in its group 86, 88, 90 as determined by step 132. The remote data 207 is received via the cloud interface unit 208 of the control system 204.

At step 138, the vehicle processing unit 12 sorts the local data 205 received from the vehicle sensing module 206 and the remote data 207 received from cloud interface unit 208 according to processing priority (risk) level, as has been described with respect to FIG. 3. The processing unit 12 may classify the local data 205 and the remote data 207 as to processing priority (risk) level, which may make use of the associated data subjects described with respect to step 134. Alternatively, the remote data 207 may have been classified by processing priority (risk) level at the could server 10. For example, the cloud server 10 may classify the remote data 207 based on distance between objects and the vehicle 202.

At step 140, the vehicle processing unit 12 processes the remote data 207 and the local data 205 at an update frequency according to processing priority (risk) level as determined in step 138. For example, local data 205 is processed at a higher frequency (that is an associated processing algorithm is iterated at a higher rate) than the remote data 207 as the remote data 207 generally concerns less immediate risks and will be classified accordingly. Further, the local data 205 may be classified into plural processing priority (risk) levels. In one example, local data 205 obtained from the object detection unit 16 is processed at a greater update rate than local data 205 obtained from the vehicle to external wireless communications unit 32. Similarly, in exemplary embodiments, the remote data 207 will be classified into plural processing priority (risk) levels such as road slip data being classified as higher processing priority (risk) than road closure data and will be processed accordingly.

At step 142, the processing of step 140 returns at least one control command 13 for output, which can be sent to the vehicle control unit 14 for action. Such control commands 13 may include at least one of automated braking control, automated speed control, automated steering control, user interface control, etc.

At step 144, the control command 13 from step 142 is executed by controlling at least one feature of the vehicle 12, optionally through the braking control unit 38, the engine power control unit 190, the steering control unit 36 and/or the driver interface unit 40.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A control system for a vehicle, comprising:
a vehicle sensing module configured to provide local data;
a cloud interface unit configured to provide remote data received from a cloud server, the cloud server is remote from the vehicle and processes data received from sources other than the vehicle;
a processing unit configured to process the local data and the remote data and to generate at least one vehicle control command based thereon; and
a vehicle control unit configured to control at least one vehicle feature based on the at least one vehicle control command,
wherein the remote data and the local data are associated with a processing priority level, wherein a first priority level is associated with the local data, and a second priority level is associated with the remote data, and the processing unit is configured to vary a frequency of processing of the remote data and the local data by decreasing the frequency of processing from the first priority level to the second priority level.

2. The control system of claim 1, wherein the vehicle control unit is configured to control at least one of a steering control unit, an engine power control unit, a braking control unit and a driver interface unit based on the at least one vehicle control command.

3. The control system of claim 1, wherein the remote data received by the cloud interface unit is associated with data subjects, and wherein the remote data received by the cloud interface unit from the cloud server is filtered based at least partly on distance from the vehicle, and wherein different data subjects are filtered based on different distances from the vehicle.

4. The control system of claim 1, wherein the vehicle sensing module includes an object detection unit configured to detect at least one object located outside of the vehicle and to provide object data based thereon, wherein the local data includes the object data.

5. The control system of claim 4, wherein the vehicle sensing module includes a vehicle to external device wireless communications unit configured to provide the local data, wherein the local data from the object detection unit is associated with a first sub-priority level of the first priority level and the local data from the vehicle to external device wireless communications unit is associated with a second sub-priority level of the first priority level, wherein the processing unit varies the frequency of processing of the local data by decreasing the frequency of processing from the first sub-priority level to the second sub-priority level.

6. The control system of claim 1, wherein the remote data includes road slip data, and wherein the road slip data is associated with a first sub-priority level of the second priority level.

7. The control system of claim 6, wherein the remote data includes road and lane closure data, and wherein the road and lane closure data is associated with a second sub-priority level of the second priority level, wherein the processing unit varies the frequency of processing of the remote data by decreasing the frequency of processing from the first sub-priority level to the second sub-priority level.

8. The control system of claim 7, wherein the remote data includes traffic congestion data, and wherein the traffic congestion data is associated with a third sub-priority level of the second priority level, wherein the processing unit varies the frequency of processing of the remote data by decreasing the frequency of processing from the second sub-priority level to the third sub-priority level.

9. A vehicle control method, comprising:
receiving local data via at least one vehicle sensor of a vehicle control system;
receiving remote data via a cloud interface unit of the vehicle control system from a cloud server, the cloud server is remote from the vehicle and processes data received from sources other than the vehicle;
processing the local data and the remote data via a processing unit of the vehicle control system;
based on the processing of the local data and the remote data, controlling at least one responsive vehicle feature, wherein the remote data and the local data are associated with a processing priority level, wherein a first priority level is associated with the local data, and a second priority level is associated with the remote data, and the processing comprises varying a frequency of processing of the remote data and the local data by decreasing the frequency of processing from the first priority level to the second priority level.

10. The vehicle control method of claim 9, wherein the controlling step comprises controlling at least one of a steering operation via a steering control unit, a braking operation via a braking control unit, an engine power operation via an engine power control unit and a driver alert via a driver interface unit based on the at least one vehicle control command.

11. The vehicle control method of claim 9, comprising associating the remote data received by the cloud interface unit with data subjects, filtering based at least partly on distance from the vehicle, via the cloud server, so that the remote data received by the cloud interface unit from the cloud server is filtered based at least partly on distance from the vehicle, and wherein different data subjects are filtered based on different distances from the vehicle.

12. The vehicle control method of claim 9, further comprising: allocating, via the cloud server, vehicles to a plurality of groups based at least on location data including allocating said vehicle to one of the plurality of groups; determining, via the cloud server, different remote data for each group; transmitting the determined remote data to vehicles within each group including said vehicle so that remote data is received via the cloud interface unit of the vehicle from the cloud server.

13. The vehicle control method of claim 9, wherein the local data includes data on objects located outside of the vehicle.

14. The vehicle control method of claim 13, wherein the local data includes data received from at least one external wireless device via a vehicle to external device wireless communication unit, wherein the data on objects located outside of the vehicle is associated with a first sub-priority level of the first priority level and the local data from the vehicle to external device wireless communications unit is associated with a second sub-priority level of the first priority level, wherein the varying the frequency of processing of the local data comprises decreasing the frequency of processing from the first sub-priority level to the second sub-priority level.

15. The vehicle control method of claim 9, wherein the remote data includes road slip data, and wherein the road slip data is associated with a first sub-priority level of the second priority level.

16. The vehicle control method of claim 15, wherein the remote data includes road and lane closure data, and wherein the road and lane closure data is associated with a second sub-priority level of the second priority level, wherein the varying the frequency of processing of the remote data comprises decreasing the frequency of processing from the first sub-priority level to the second sub-priority level.

17. The vehicle control method of claim 16, wherein the remote data includes traffic congestion data, and wherein the traffic congestion data is associated with a third sub-priority level of the second priority level, wherein the varying the frequency of processing of the remote data comprises decreasing the frequency of processing from the second sub-priority level to the third sub-priority level.

* * * * *